(12) United States Patent
Whalen et al.

(10) Patent No.: US 8,505,999 B2
(45) Date of Patent: Aug. 13, 2013

(54) VEHICULAR SEAT ASSEMBLY AND VEHICLES INCLUDING SAME

(75) Inventors: Kelly Michael Whalen, Lewis Center, OH (US); Grey Burchfield Parker, Columbus, OH (US); Todd Alan Morris, Columbus, OH (US); Eric Dustin Daume, Dublin, OH (US); Brooks G. Marquette, Columbus, OH (US); Matthew W. Wolfe, Powell, OH (US)

(73) Assignee: Honda Motor Company, Ltd., Tokyo (JP)

( * ) Notice: Subject to any disclaimer, the term of this patent is extended or adjusted under 35 U.S.C. 154(b) by 105 days.

(21) Appl. No.: 12/493,613

(22) Filed: Jun. 29, 2009

(65) Prior Publication Data

US 2010/0327635 A1 Dec. 30, 2010

(51) Int. Cl.
*B60N 2/32* (2006.01)
(52) U.S. Cl.
USPC ............... 296/65.09; 296/65.16; 297/129
(58) Field of Classification Search
USPC ............ 296/37.16, 64, 65.01, 65.05, 65.09, 296/65.16, 66, 69; 297/354.1, 129; 410/97, 410/118, 139
See application file for complete search history.

(56) References Cited

U.S. PATENT DOCUMENTS

| 4,637,648 A | 1/1987 | Okino et al. |
| 5,322,335 A | 6/1994 | Niemi |
| 5,582,453 A | 12/1996 | Leuchtmann et al. |
| 6,089,641 A * | 7/2000 | Mattarella et al. ............ 296/64 |
| 6,296,291 B1 | 10/2001 | Lansinger |
| 6,402,250 B1 | 6/2002 | Lange |
| 6,536,843 B1 * | 3/2003 | Severinski et al. ...... 297/378.12 |
| 6,648,395 B2 | 11/2003 | Hoshino |
| 6,817,660 B2 | 11/2004 | Ito et al. |

(Continued)

FOREIGN PATENT DOCUMENTS

| DE | 10261399 A1 * | 7/2004 |
| EP | 0982184 A2 | 3/2000 |

(Continued)

OTHER PUBLICATIONS

European Search Report, European Application No. 10163118.2-2424, mailed on Jul. 29, 2010, 3 pages.

(Continued)

*Primary Examiner* — Glenn Dayoan
*Assistant Examiner* — Jason S Daniels
(74) *Attorney, Agent, or Firm* — Ulmer & Berne LLP (57) ABSTRACT

A vehicle includes a body structure, a cargo surface, and a vehicular seat assembly. The body structure defines a floor. The vehicular seat assembly includes a left leg member, a right leg member, a support member, a seat back, and a cover panel. The support member is attached to the left and right leg members. The seat back is pivotally coupled with the left and right leg members. The seat back is pivotable between an upright position and a cargo support position. The cover panel is coupled with the support member and is movable between a stowed position and a bridging position. When the seat back is in the cargo support position with the cover panel in the bridging position, the support member provides underlying support for the cover panel, and the cargo surface, the cover panel, and the seat back cooperate to provide a generally planar load support surface.

23 Claims, 10 Drawing Sheets

(56) References Cited

U.S. PATENT DOCUMENTS

| | | | |
|---|---|---|---|
| 6,874,840 B2 | 4/2005 | Neale | |
| 6,929,301 B2 | 8/2005 | Kim et al. | |
| 7,036,884 B2 | 5/2006 | Becker et al. | |
| 7,216,916 B2 | 5/2007 | Czerwinski et al. | |
| 2002/0135215 A1 | 9/2002 | Magyar et al. | |
| 2003/0057724 A1* | 3/2003 | Inagaki et al. | 296/37.8 |
| 2006/0061120 A1* | 3/2006 | Czerwinski et al. | 296/63 |
| 2008/0143163 A1 | 6/2008 | Harth | |
| 2008/0185866 A1 | 8/2008 | Tarrant et al. | |

FOREIGN PATENT DOCUMENTS

| | | | |
|---|---|---|---|
| FR | 2850336 A1 | 7/2004 | |
| FR | 2920718 A1 | 3/2009 | |
| GB | 1249787 A | 10/1971 | |
| GB | 2456345 A | 7/2009 | |
| JP | 63-154343 U | 10/1988 | |
| JP | 02-77143 U | 6/1990 | |
| JP | 02-91035 U | 7/1990 | |
| JP | 03-52241 U | 5/1991 | |
| JP | 2005-022482 A | 1/2005 | |
| JP | 2007-237806 A | 9/2007 | |
| WO | WO 2009010149 A1 * | 1/2009 | |

OTHER PUBLICATIONS

Office Action for corresponding Russian Application No. 2010126480/11(037713); Mailing Date: Feb. 9, 2012; in its entirety.

Examiner's Report, Canadian Patent Application No. 2,704,435, dated Aug. 1, 2012, 2 pages, in its entirety.

Office Action in corresponding Japanese Patent Application No. 2010-122319, dated Aug. 21, 2012, 3 pages, in its entirety.

Office Action in corresponding Japanese Patent Application No. 2010-122319, dated Feb. 5, 2013, 4 pages in its entirety, along with partial English-language translation.

Office Action in corresponding Mexican Patent Application No. MX/a/2010/007071; dated Mar. 27, 2013; 2 pages in its entirety.

* cited by examiner

VEHICULAR SEAT ASSEMBLY AND VEHICLES INCLUDING SAME

TECHNICAL FIELD

Vehicles are provided which include a seat assembly. The seat assembly includes a cover panel coupled with a support member.

BACKGROUND

Some conventional vehicles include rear seats that can be folded forward to enlarge the vehicle's rear cargo area. When the rear seats are folded forward, a gap is exposed between the rear seats and a rear cargo surface. This gap affects the ease of loading and unloading of cargo into the rear cargo area. For example, the loading of cargo into the rear cargo area is oftentimes easily achieved by sliding the cargo along the cargo surface. However, if the cargo needs to be slid from the cargo surface and onto the folded rear seat, the cargo can become obstructed by the gap. Smaller cargo provided into the rear cargo area can fall into the gap and become hidden from plain view, and can be damaged by the rear seat when unfolded. In some conventional vehicles, a cover panel (e.g., a flipper panel) is accordingly provided that covers this gap when the rear seat is folded forward.

SUMMARY

In accordance with one embodiment, a vehicle comprises a body structure, a cargo surface, and a vehicular seat assembly. The body structure defines a floor. The cargo surface is supported with respect to the floor. The vehicular seat assembly includes a left leg member, a right leg member, a support member, a seat back, and a cover panel. The left leg member is attached to the floor. The right leg member is spaced from the left leg member and is attached to the floor. The support member extends between a left end and a right end. The support member is attached to the left leg member adjacent to the left end and is attached to the right leg member adjacent to the right end. The seat back is pivotally coupled with each of the left leg member and the right leg member. The seat back is pivotable between an upright position and a cargo support position. The cover panel is coupled with the support member and is movable with respect to the support member between a stowed position and a bridging position. When the seat back is in the cargo support position with the cover panel in the bridging position, the support member provides underlying support for the cover panel, and the cargo surface, the cover panel, and the seat back cooperate to provide a generally planar load support surface.

In accordance with yet another embodiment, a vehicle comprises a body structure, a cargo surface, and a vehicular seat assembly. The body structure defines a floor. The cargo surface is supported with respect to the floor. The vehicular seat assembly comprises a left leg member, a right leg member, a center leg member, a support member, a right seat back portion, a left seat back portion, a left cover panel, and a right cover panel. The left leg member is attached to the floor. The right leg member is spaced from the left leg member and is attached to the floor. The center leg member is spaced from the left and right leg members and is attached to the floor. The support member extends between a left end and a right end. The support member is attached to the left leg member adjacent to the left end. The support member is attached to the right leg member adjacent to the right end. The right seat back portion is pivotally coupled with the right leg member and the center leg member and is pivotable between an upright position and a cargo support position. The left seat back portion is pivotally coupled with each of the left leg member and the center leg member and is pivotable between an upright position and a cargo support position. The left cover panel is coupled with the support member and is associated with the left seat back portion. The left cover panel is pivotable with respect to the support member between a stowed position and a bridging position. The right cover panel is coupled with the support member and is associated with the right seat back portion. The right cover panel is pivotable with respect to the support member between a stowed position and a bridging position. When the left seat back portion and the right seat back portion are in the respective cargo support positions with the left cover panel and the right cover panel in the respective bridging positions, the support member provides underlying support for each of the left cover panel and the right cover panel, and the cargo surface, the left cover panel, the right cover panel, the left seat back portion, and the right seat back portion cooperate to provide a generally planar load support surface.

In accordance with yet another embodiment, a vehicular seat assembly comprises a left leg member, a right leg member, a support member, a seat back, and a cover panel. The left leg member is for attachment to a vehicle floor. The right leg member is spaced from the left leg member and is for attachment to the vehicle floor. The support member extends between a left end and a right end. The support member is attached to the left leg member adjacent to the left end. The support member is attached to the right leg member adjacent to the right end. The seat back has a left seat back portion pivotally coupled with the left leg member and a right seat back portion pivotally coupled with the right leg member. The seat back is pivotable between an upright position and a cargo support position. The cover panel is coupled with the support member and is movable with respect to the support member between a stowed position when the seat back is in the upright position, and a bridging position when the seat back is in the cargo support position.

BRIEF DESCRIPTION OF THE DRAWINGS

Various embodiments will become better understood with regard to the following description, appended claims and accompanying drawings wherein:

DETAILED DESCRIPTION

Figure 1:
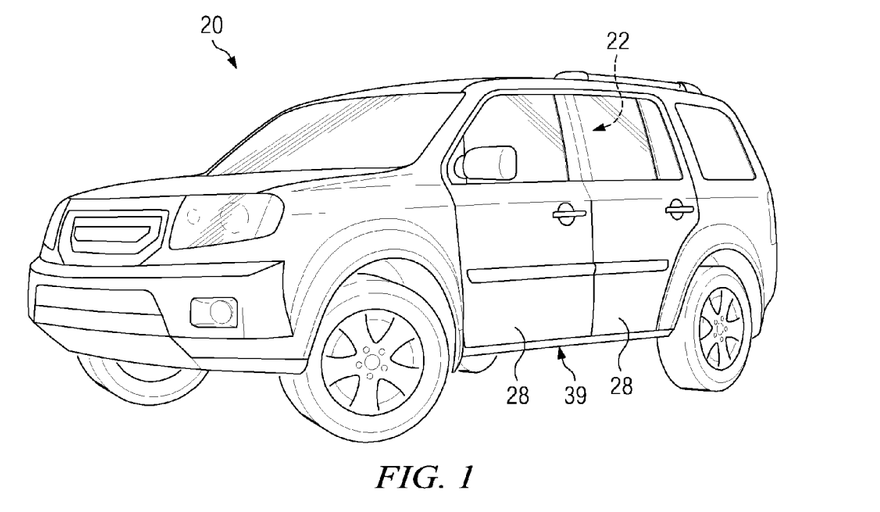
FIG. 1 is a front perspective view depicting a vehicle in accordance with one embodiment.
Figure 2:
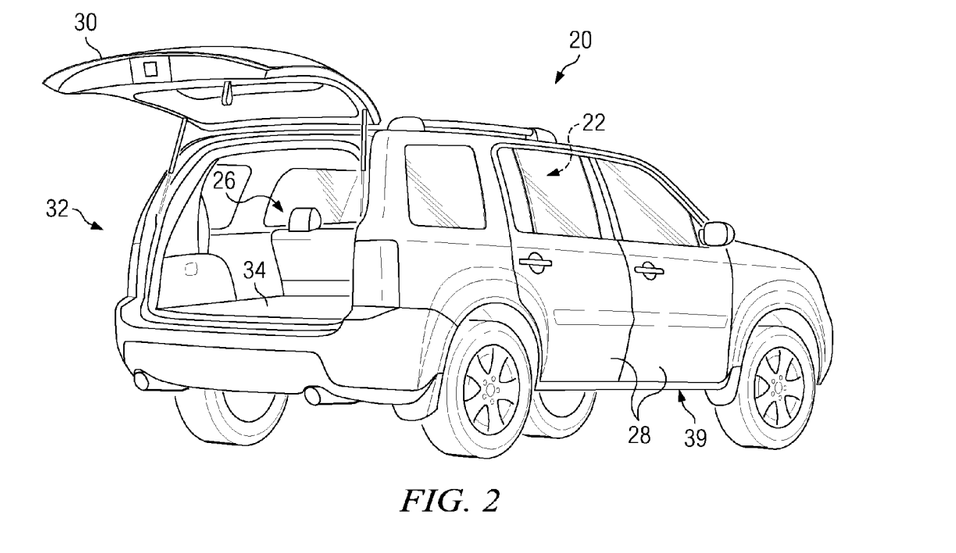
FIG. 2 is a rear perspective view depicting the vehicle of claim 1, wherein a rear door is opened to reveal a passenger compartment.

In connection with the views and examples of FIGS. 1-12, wherein like numbers indicate the same or corresponding elements throughout the views, FIGS. 1 and 2 illustrate a vehicle 20. The vehicle 20 is shown in FIGS. 1 and 2 to comprise a sport utility vehicle ("SUV"). However, a vehicle in accordance with alternative embodiments can comprise a truck, a van, a crossover-type vehicle, a recreational vehicle, an all terrain vehicle, or a utility vehicle, for example.

As illustrated in FIG. 1, the vehicle 20 can include a passenger compartment 22. The vehicle 20 can include front and rear seating assemblies that facilitate support of passengers within the passenger compartment 22. For example, a rear seating assembly 26 is partially shown in FIG. 2. The vehicle 20 can also include side doors 28 that facilitate selective access to the passenger compartment 22. As illustrated in FIG. 2, the vehicle 20 can additionally include a rear door 30 that facilitates selective access to a cargo area 32. A cargo surface 34 can be provided to facilitate support of cargo within the cargo area 32. The cargo surface 34 is shown to be disposed behind the rear seating assembly 26.

Figure 3:
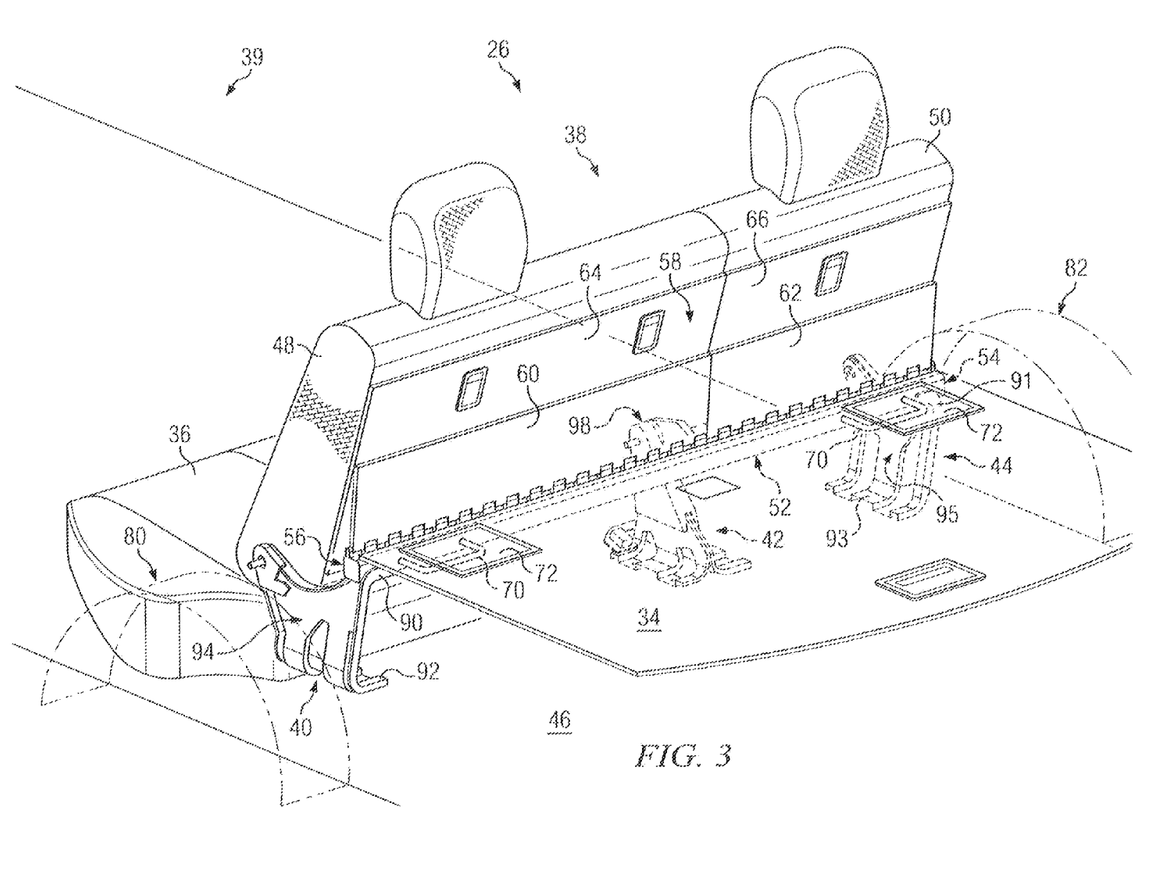
FIG. 3 is a left rear perspective view depicting a rear seat assembly and other various vehicular components within the passenger compartment of the vehicle of FIG. 2.

As illustrated in FIG. 3, the rear seating assembly 26 can include a seat bottom 36 and a seat back 38 that cooperate to facilitate support of passengers within the passenger compartment 22. The seat bottom 36 and the seat back 38 can be supported with respect to a body structure 39 of the vehicle 20. The body structure 39 can comprise one or more frame members, body members, and/or other components which generally form a shell of the vehicle 20. In one embodiment, and as illustrated in FIG. 3, the rear seating assembly 26 can include a left leg member 40, a center leg member 42, and a right leg member 44. Each of the left, center, and right leg members 40, 42, 44 are shown to be spaced from one another and attached to a floor 46 defined by the body structure 39 of the vehicle 20. A left seat back portion 48 of the seat back 38 can be pivotally supported by the left leg member 40 and the center leg member 42. A right seat back portion 50 of the seat back 38 can be pivotally supported by the center leg member 42 and the right leg member 44. In one embodiment, the seat bottom 36 can be fixed with respect to each of the left, center, and right leg members 40, 42, 44.

Figure 4:
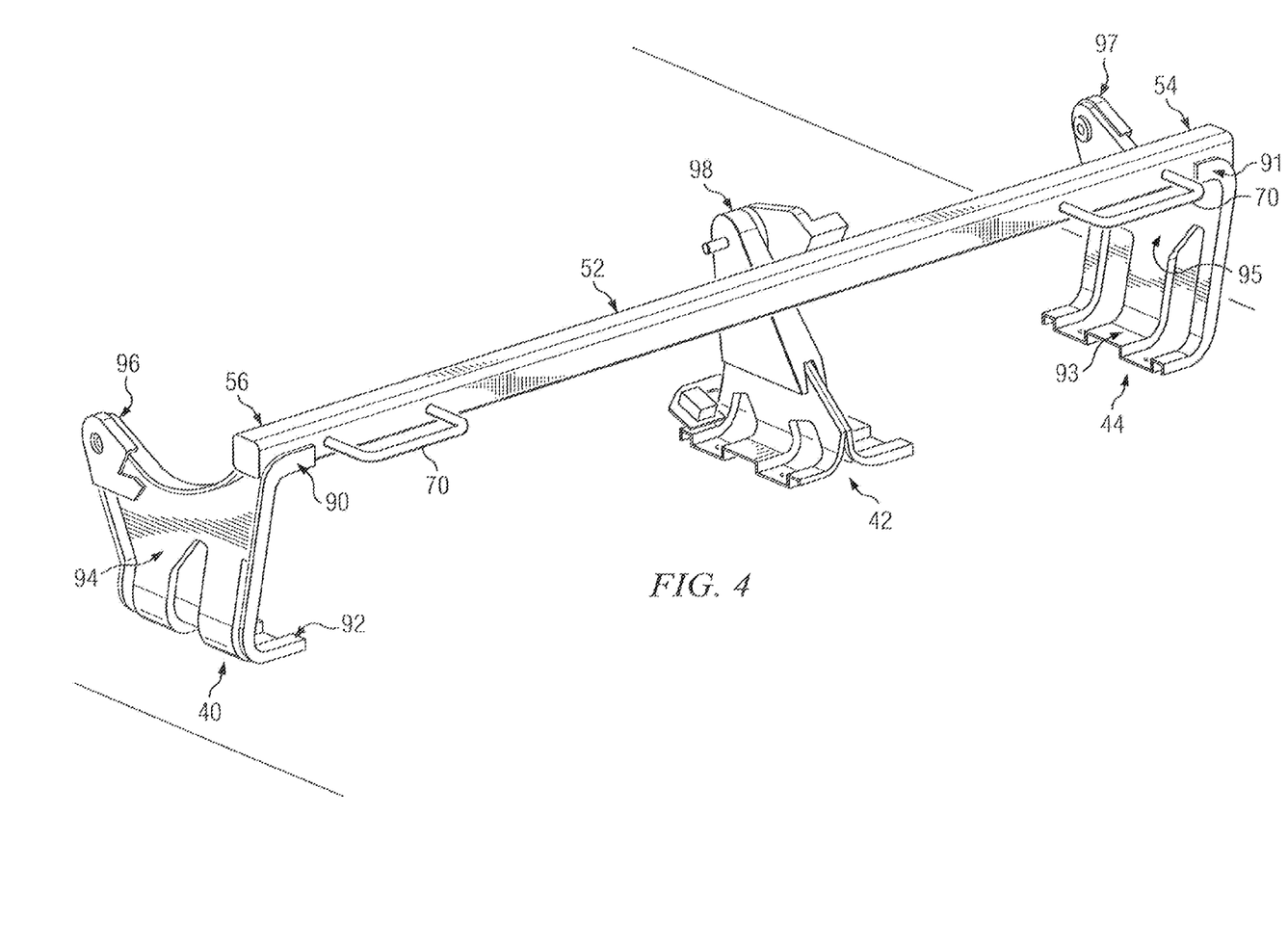
FIG. 4 is a left rear perspective view depicting certain components of the rear seat assembly of FIG. 3.

As illustrated in FIGS. 3 and 4, a support member 52 can be attached to the left and right leg members 40, 44. The support member 52 is shown to extend between a left end 56 and a right end 54. In one embodiment, as illustrated in FIGS. 3 and 4, the left leg member 40 is attached adjacent to the left end 56 and the right leg member 44 is attached adjacent to the right end 54. The center leg member 42 can be attached to the support member 52 at a location between the left end 56 and the right end 54. In one embodiment, the support member 52 can be attached to each of the left, center, and right leg members 40, 42, 44 with welds, fasteners, adhesive, and/or any of a variety of suitable alternative attachment methods. In an alternative embodiment, a support member can be attached to leg members through integral one piece construction.

The left leg member 40 is shown to include an upper flange 90 and a lower flange 92 that each extend transversely from a central portion 94. The right leg member 44 is shown to include an upper flange 91 and a lower flange 93 that each extend transversely from a central portion 95. The left and right leg members 40, 44 are shown to be arranged such that the upper flanges 90, 91 extend towards one another and the lower flanges 92, 93 extend towards one another. Each of the upper flanges 90, 91 can provide underlying support to the left and right ends 56, 54 of the support member 52, respectively. Each of the upper flanges 90, 91 are shown to be substantially U-shaped such that they generally conform to the overall shape of the support member 52. The lower flanges 92, 93 can each be attached to the floor 46, such as through welding, riveting, or clinching, for example.

As illustrated in FIG. 4, each of the central portions 94, 95 of the left and right leg members 40, 44 can include a respective lobed portion 96, 97 that is substantially perpendicular to the upper and lower flanges 90, 92 and the upper and lower flanges 91, 93, respectively. Each of the left and right seat back portions 48, 50 are directly pivotally supported by the lobed portions 96, 97 of the respective left and right leg members 40, 44. As illustrated in FIGS. 3 and 4, the center leg member 42 can also include a lobed portion 98 which directly pivotally supports each of the left and right seat back portions 48, 50.

As illustrated in FIG. 3, the rear seating assembly 26 can include a cover panel 58 which is pivotally coupled with the support member 52. In one embodiment, the cover panel 58 can include a left cover panel 60 and a right cover panel 62, as shown in FIG. 3. The left cover panel 60 can be associated with a left cargo support surface 64 of the left seat back portion 48 and the right cover panel 62 can be associated with a right cargo support surface 66 of the right seat back portion 50.

Figure 5:
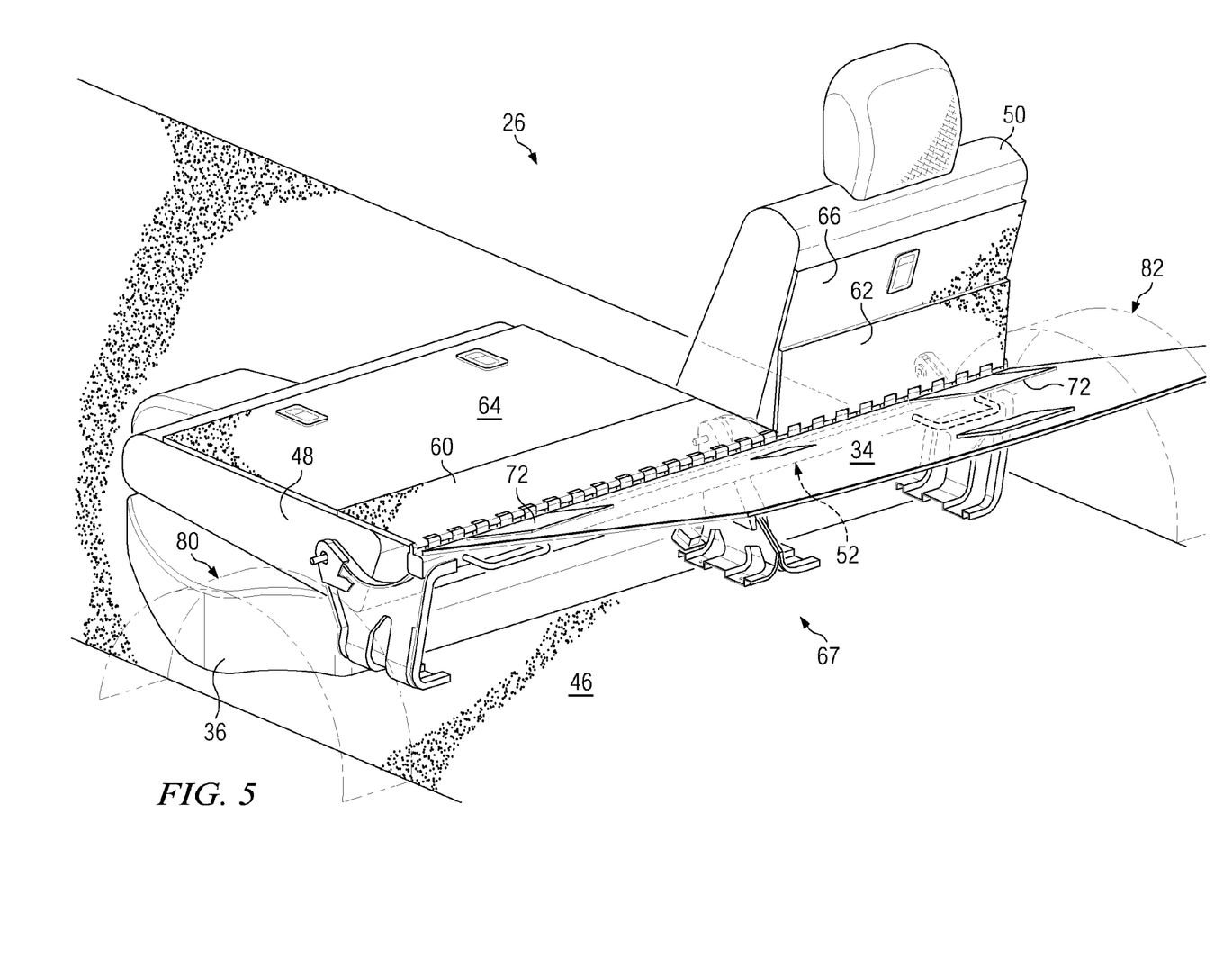
FIG. 5 is a left rear perspective view of the rear seat assembly of FIG. 3 with a left seat back portion in a cargo support position and a cargo surface in a raised position.

The cargo surface 34 can be provided adjacent to the cover panel 58 and can be configured to cover an underlying cargo storage area 67 (see FIG. 5) and/or a portion of the cargo surface 34 can facilitate support of cargo within the cargo area 32. In one embodiment, the support member 52 can provide underlying support of the cargo surface 34 such that loading of the cargo surface 34 is at least partially transmitted to the support member 52. In such an embodiment, the support member 52 can facilitate improved support of cargo within the cargo area 32. For example, by providing lateral support across the width of the cargo surface 34, fewer dedicated cargo surface supports might be needed, thereby reducing cost and weight of the vehicle 20. In one embodiment, the cargo surface 34 can be pivotally attached to the support member 52 such that the cargo surface 34 is movable as a lid to facilitate selective access to the underlying cargo storage area 67. For example, the cargo surface 34 can be pivoted from a substantially closed position (as illustrated in FIG. 3) to an opened position (as illustrated in FIG. 5). It will be appreciated that a vehicle can have any of a variety of suitable alternative cargo surface arrangements. For example, an alternative cargo surface can include a pair of lids that are each pivotable between opened and closed positions to facilitate selective access to an underlying cargo storage area. In still another embodiment, or cargo surface can be rigidly secured to a support member.

As illustrated in FIG. 4, the support member 52 can include a pair of cargo attachment members 70. When cargo is placed upon the cargo surface 34, the cargo can be releasably attached (e.g., with a retaining strap) to the attachment members 70 to secure the cargo within the cargo area 32. The attachment members 70 are shown at a location along the support member 52 that is typically concealed by the cargo surface 34. Therefore, the cargo surface 34 can include access panels (e.g., 72 in FIG. 3) that can selectively conceal the attachment members 70 from view. It will be appreciated that the support member 52 can include any of a variety of suitable alternative cargo attachment locations, such as "D-rings" or apertures, for example that may or may not be typically concealed by the cargo surface 34.

The left and right seat back portions 48, 50 can each be pivoted between an upright position and a cargo support position. Movement of the left seat back portion 48 between the upright and cargo support positions can facilitate movement of the left cover panel 60 between a stowed position and a bridging position. Similarly, movement of the right seal back portion 50 between the upright and cargo support positions can facilitate movement of the right cover panel 62 between a stowed position and a bridging position.

In one embodiment, as illustrated in FIG. 3, the left and right seat back portions 48, 50 can be provided in upright positions. In such an arrangement, the left and right cover panels 60, 62 can be provided in stowed positions and can cooperate with the left and right cargo support surfaces 64, 66 to form a front wall for the cargo area 32.

In another embodiment, as illustrated in FIG. 5, the left seat back portion 48 can be provided in the cargo support position and the right seat back portion 50 can be provided in the upright position. The left cover panel 60 is shown to be provided in the bridging position and can cooperate with the left cargo support surface 64 and the cargo surface 34 to form a generally planar load support surface along the left side of the cargo area 32. The right cover panel 62 is shown to be provided in the upright position and can cooperate with the right support surface 66 to form a front wall for the right side of the cargo area 32.

Figure 6:
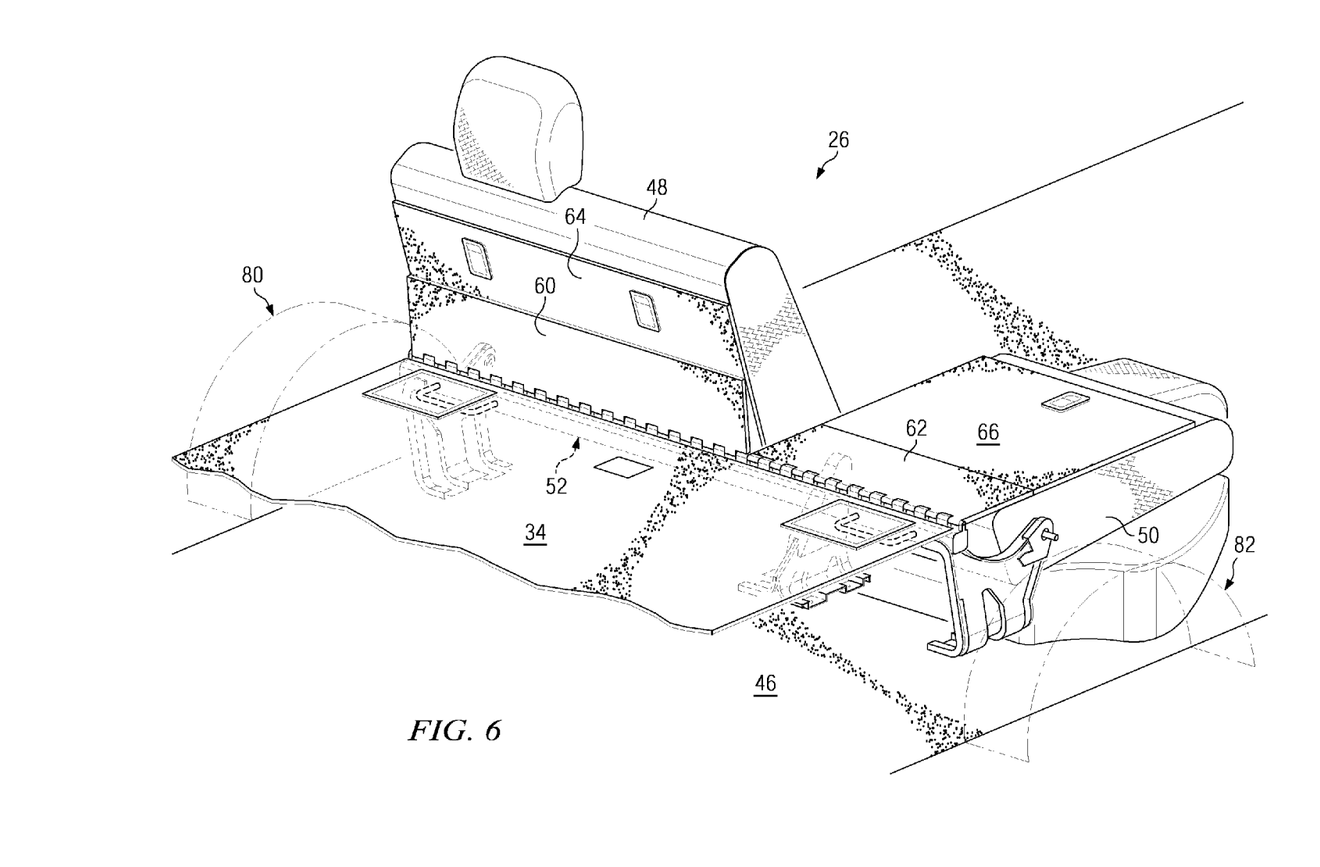
FIG. 6 is a right rear perspective view of the rear seat assembly of FIG. 3 with a right seat back portion in a cargo support position.

In another embodiment, as illustrated in FIG. 6, the right seat back portion 50 can be provided in the cargo support position and the left seat back portion 48 can be provided in the upright position. The right cover panel 62 is shown to be provided in the bridging position and can cooperate with the right cargo support surface 66 and the cargo surface 34 to form a generally planar load support surface along the right side of the cargo area 32. The left cover panel 60 is shown to be provided in a stowed position and can cooperate with the left support surface 64 to form a front wall for the left side of the cargo area 32.

Figure 7:
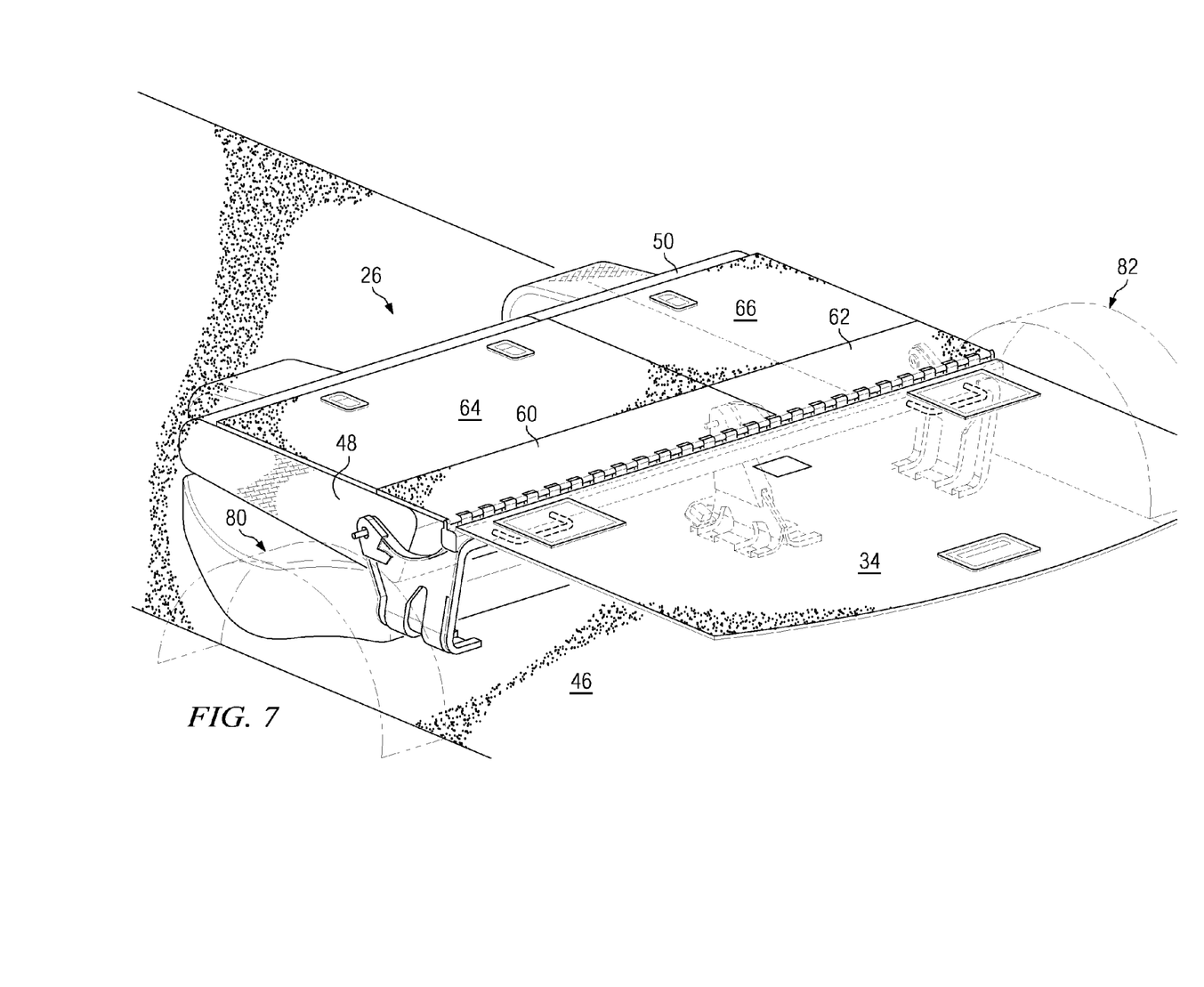
FIG. 7 is a left rear perspective view of the rear seat assembly of FIG. 3 with the left and right seat back portions in cargo support positions.
Figure 8:
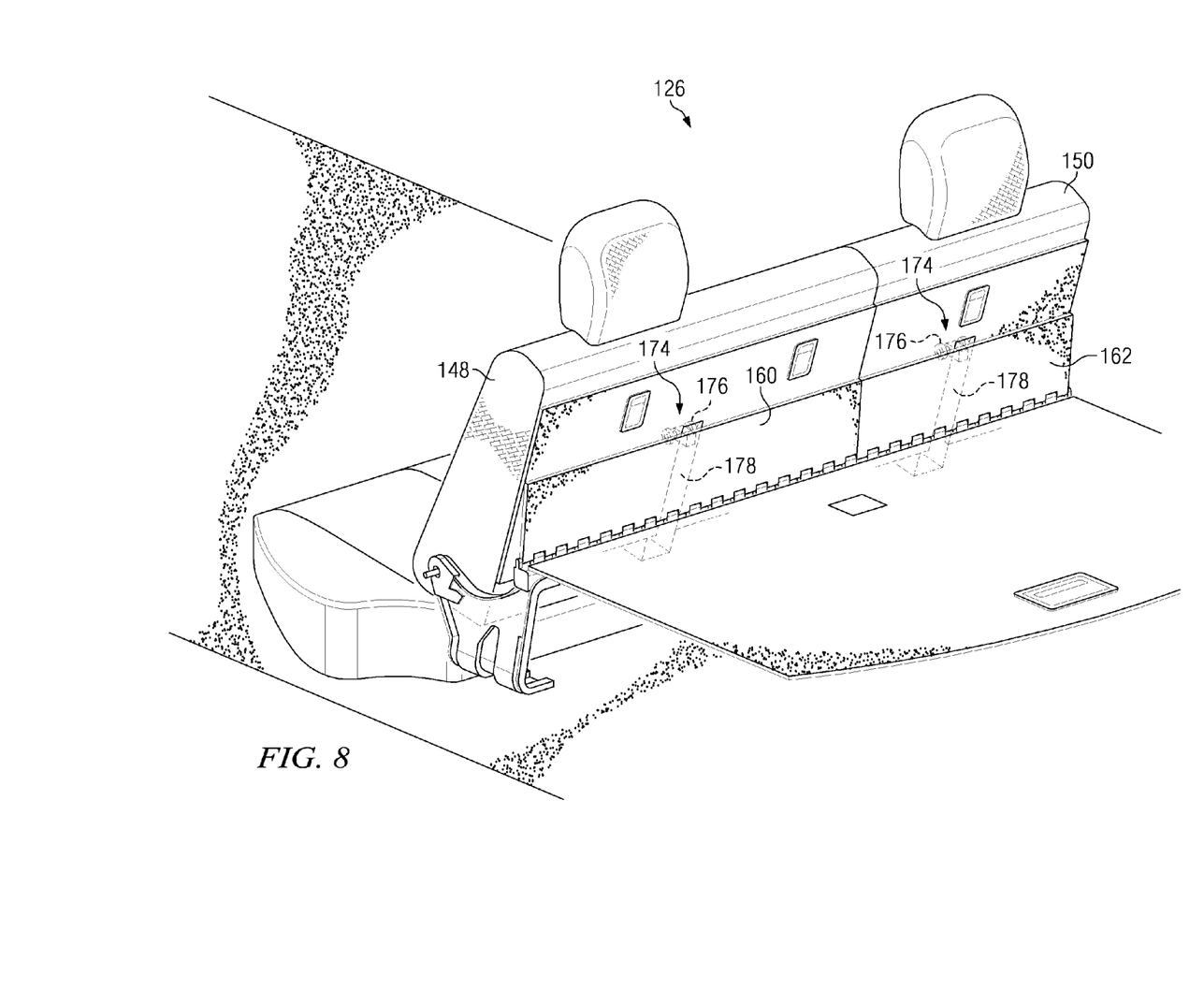
FIG. 8 is a left rear perspective view depicting a rear seat assembly and other various vehicular components within a passenger compartment of a vehicle according to an alternative embodiment.

In yet another embodiment, as illustrated in FIG. 7, the left and right seat back portions 48, 50 can each be provided in the cargo support position. In such an arrangement, the left and right cover panels 60, 62 are each shown to be provided in the bridging position and can cooperate with the cargo surface 34 and the left and right cargo support surfaces 64, 66 to form a generally planar load support surface.

It will be appreciated that since the left and right leg members 40, 44 pivotally support the left and right seat back, portions 48, 50 and the left and right cover panels 60, 62, the use of dedicated brackets for the left and right seat back portions 48, 50 and the left and right cover panels 60, 62 can be eliminated. This can case the construction and/or design of the rear seating assembly 26 and can accordingly result in save savings of cost and time. In addition, the left and right leg members 40, 44 can cooperate to keep the left and right seat back portions 48, 50 and the left and right cover panels 60, 62 properly aligned, thereby providing more consistent aesthetics and tolerances throughout movement of the left and right seat back portions 48, 50 and the left and right cover panels 60, 62.

The left and right cover panels 60, 62 can selectively contact the left and right cargo support surfaces 64, 66. For example, when the left and right seat back portions 48, 50 are each in the upright position, the left and right cover panels 60, 62 can contact the left and right cargo support surfaces 64, 66 such that they are maintained in the stowed position by the left and right seat back portions 48, 50 as generally shown in FIG. 3. When the left and right seat back portions 48, 50 are each moved to the cargo support position, as shown in FIG. 7, the left and right cover panels 60, 62 can be pivoted from the stowed position until they each assume the bridging position. When they are in the bridging position, the left and right cover panels 60, 62 can contact the respective left and right cargo support surfaces 64, 66 to provide underlying support for the left and right cover panels 60, 62. In addition, when in the bridging position, the left and right cover panels 60, 62 can pivoted away from the left and right seat back portions 48, 50 to reveal the area beneath the left and right cover panels 60, 62. It will be appreciated that in one embodiment, an operator can manually pivot one or both of the left and right cover panels 60, 62, away from the left and/or right seat back portions 48, 50 such as to recover a passenger's item that was dropped between the left and/or right seat back portion 48, 50 and the seat bottom 36.

Movement of the left and right seat back portions 48, 50 into the upright position can facilitate movement of the left and right cover panels 60, 62 into the stowed position. For example, when in the bridging positions, the left and right cover panels 60, 62 can be supported by the left and right cargo support surfaces 64, 66. Movement of the left and right seat back portions 48, 50 can change the inclination of the left and right cargo support surfaces 64, 66, thereby automatically influencing the left and right cover panels 60, 62 into the stowed position. When the left and right seat back portions 48, 50 are returned to the cargo support positions, the left and right cover panels 60, 62 can fall into the bridging position, or alternatively can be pushed or otherwise urged into the bridging position by the operator.

In an alternative embodiment, as illustrated in FIGS. 8-12, left and right cover panels 160, 162 can be movably coupled with respective left and right seat back portions 148, 150 to facilitate 'one-step' folding and/unfolding of a rear seating assembly. In particular, when the left and right seat back portions 148, 150 are moved between their upright and cargo support positions, the respective left and right cover panels 160, 162 correspondingly move between their stowed and bridging positions. It will be appreciated that, in such an arrangement, the left seat back portion 148 and/or right seat back portion 150 can be moved using one-handed operation and without the need to separately move the left and right cover panels 160, 162 into place.

Figure 9:
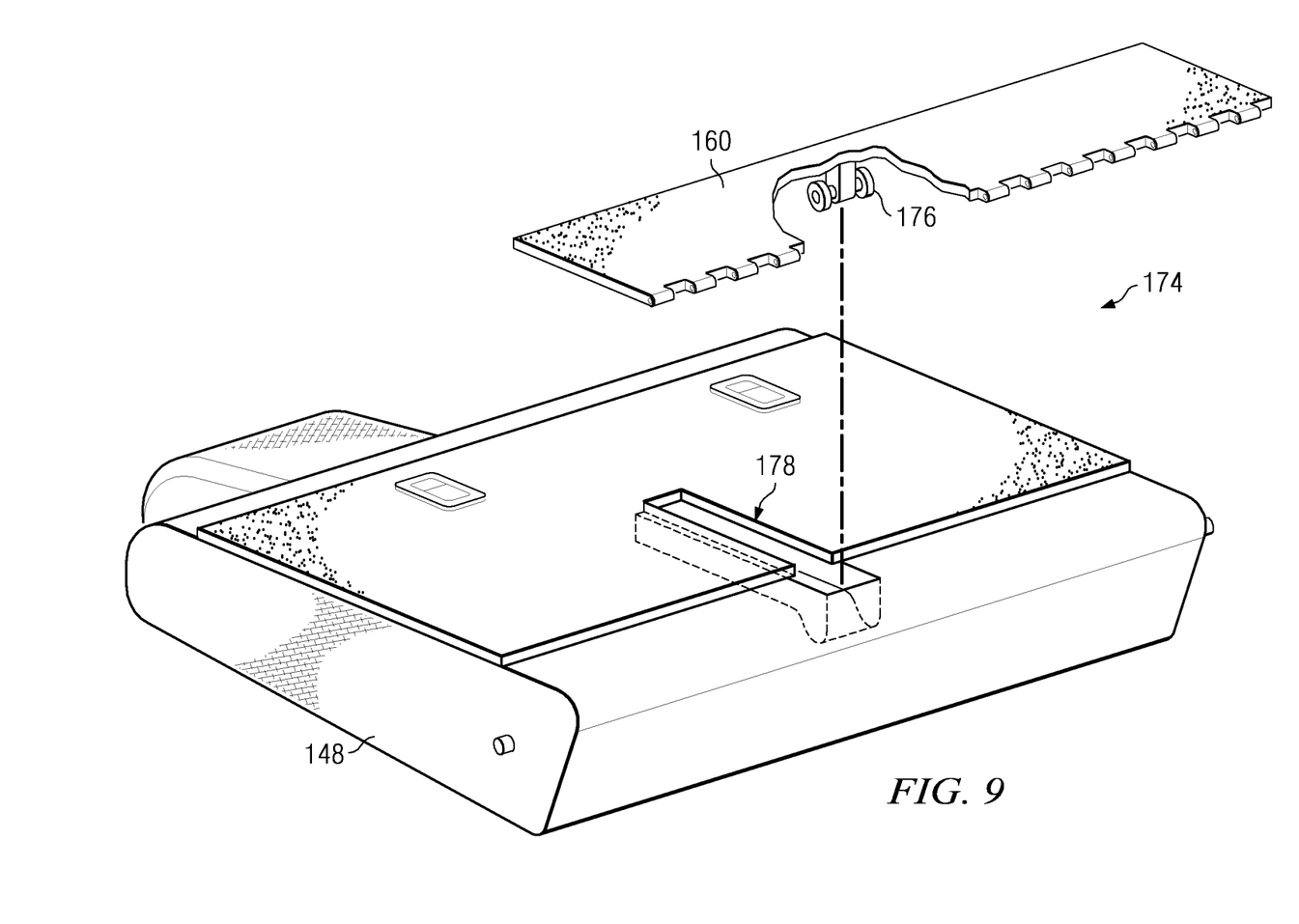
FIG. 9 is an exploded view depicting a linkage arrangement associated with a left cover panel and a left seat back portion of the rear seat assembly of FIG. 8.
Figure 10:
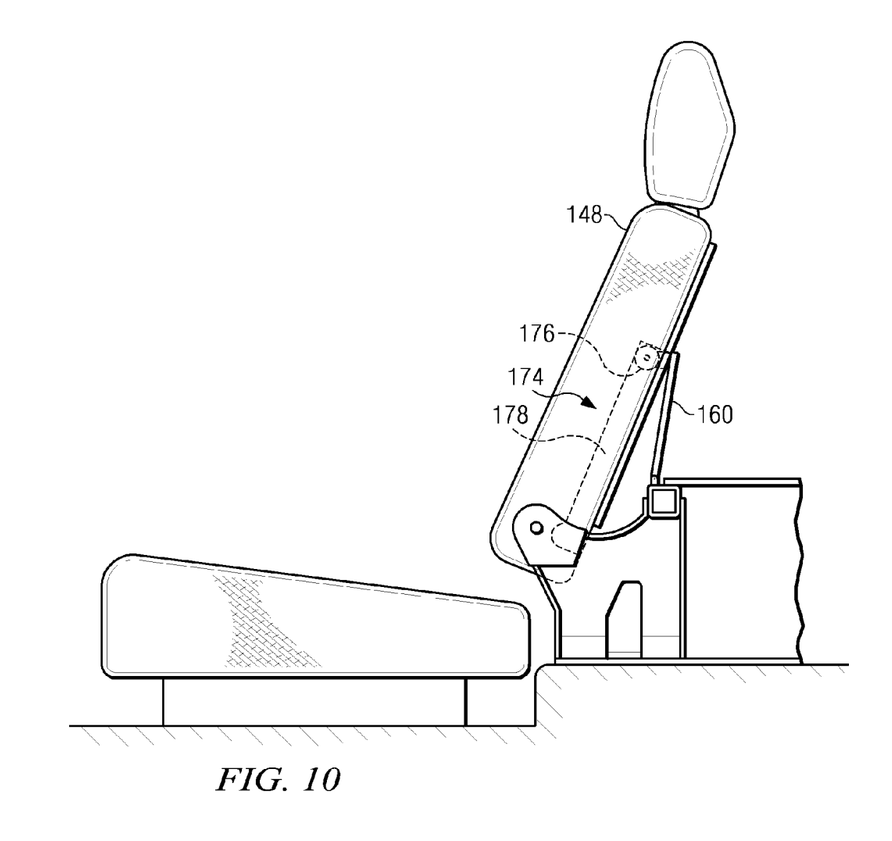
FIG. 10 is a left side elevational view generally depicting the rear seat assembly of FIG. 8 along with other vehicular components, wherein the left and right seat back portions are in upright positions.
Figure 11:
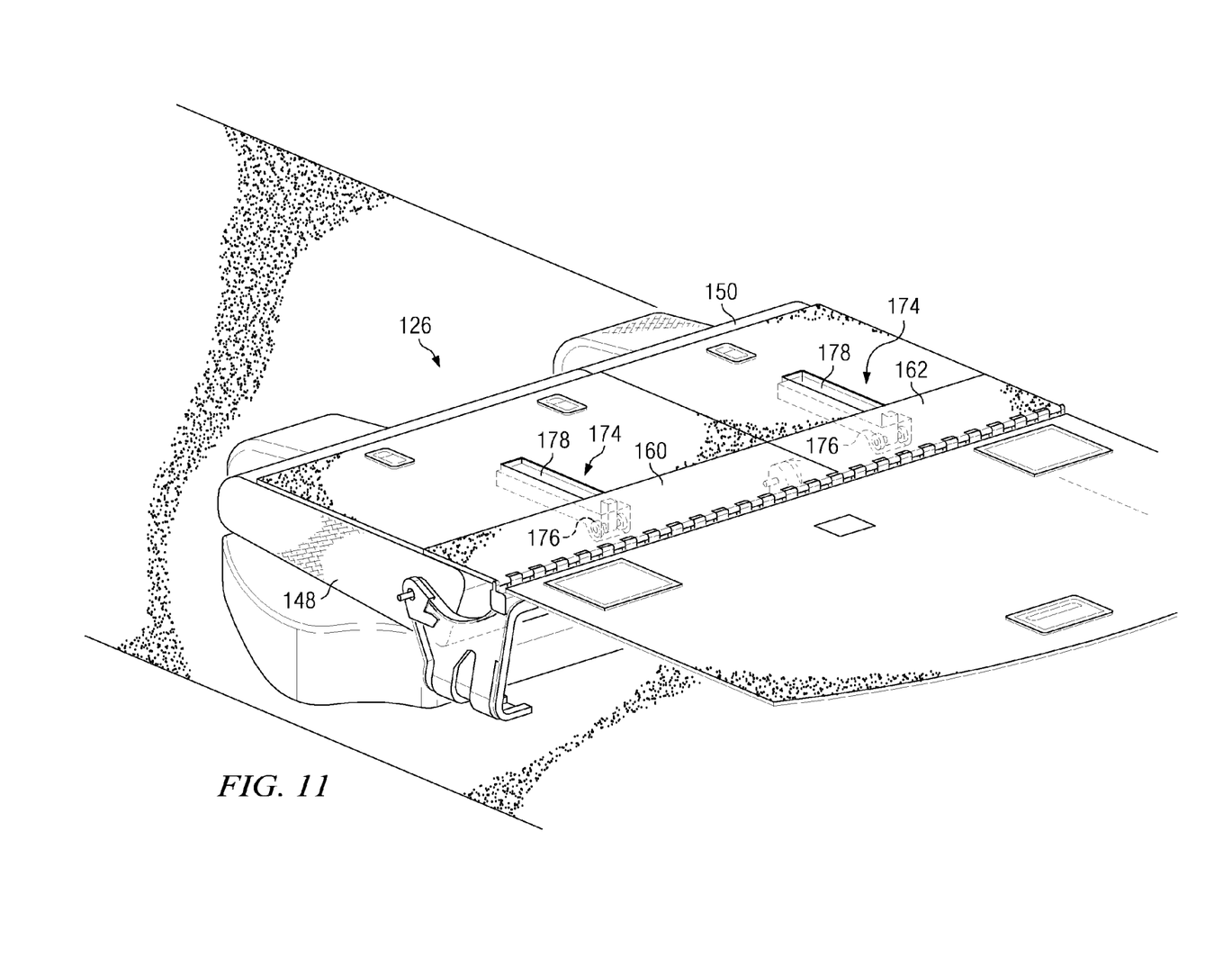
FIG. 11 is a left rear perspective view depicting the rear seat assembly and other components of FIG. 8 with left and right seat back portions in cargo support positions.
Figure 12:
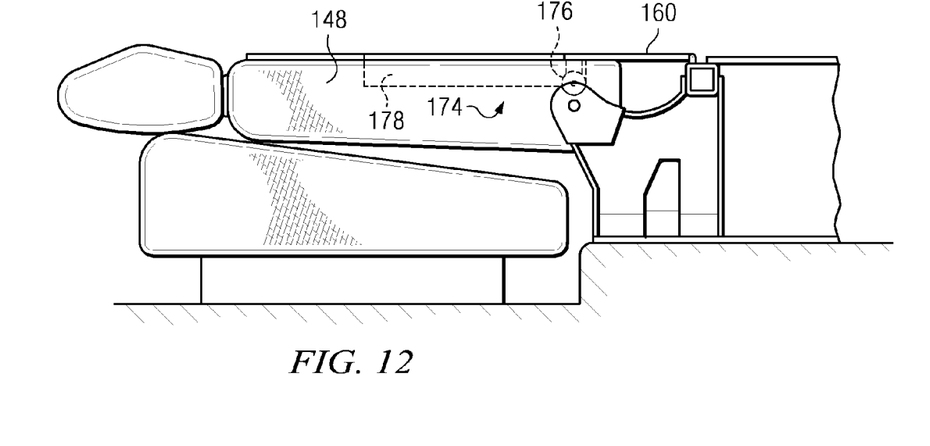
FIG. 12 is a left side elevational view depicting the rear seat assembly and other vehicular components of FIG. 10, wherein the left and right seat back portions are in cargo support positions.

In one embodiment, and as illustrated in FIGS. 8-12, the left cover panel 160 can be coupled with the left seat back portion 148 by a linkage arrangement 174. With further reference to FIG. 9, the linkage arrangement 174 is shown to include a wheeled stem 176 attached to the left cover panel 160. The linkage arrangement 174 can further include an inner channel 178 defined along the left seat back portion 148 and configured to slidably engage the wheeled stem 176. In such an embodiment, when the left seat back portion 148 is moved from the upright position to the cargo support position, the wheeled stem 176 interacts with the inner channel 178 to influence the left cover panel 160 from the stowed position to the bridging position. When the left seat back portion 148 is moved from the cargo support position to the upright position, the wheeled stem 176 interacts with the inner channel 178 to influence the left cover panel 160 from the bridging position to the stowed position. A similar linkage arrangement is similarly depicted in FIGS. 8 and 11 to be provided for the right seat back portion 150 and the right cover panel 162. It will be appreciated that a seat back portion and a cover panel can interact with each other in any of a variety of suitable arrangements that facilitate cooperative movement between a seat back portion and a cover panel.

It will be appreciated that a cover panel (e.g., 58) and/or cargo support surfaces (e.g., 64, 66) can be formed from a polymeric material or any of a variety of suitable non-polymeric materials. It will also be appreciated that a cover panel and/or a cargo support surface can include reinforcing structures such as integral rib members.

Referring again to the embodiment of FIGS. 1-7, when the left cover panel 60 is in the bridging position, the support member 52 can provide underlying support for the left cover panel 60. Additionally, when the right cover panel 62 is in the bridging position, the support member 52 can also provide underlying support for the right cover panel 62. When cargo is provided on the cover panel 58, the support member 52 can effectively support the cargo. For example, the support member 52 can prevent deformation to the left and right cover panels 60, 62 which might otherwise be caused by the weight of cargo, and which could otherwise result in fatigue to the left and right cover panels 60, 62 which could shorten their useful life. In addition, when cargo is slid along the load support surface during loading and unloading of the cargo area 32, the support member 52 can resist flexing of the left and right cover panels 60, 62, thereby allowing the cargo to slide easily over the left and right cover panels 60, 62. The support member 52 can also provide an attachment location for the left and right cover panels 60, 62, thereby eliminating the need for separate, floor-mounted or wheel-well mounted brackets for supporting the left and right cover panels 60, 62. It will be appreciated that the support member 52 can also be configured to support the left and right seat back portions 48, 50 in the upright position. Therefore, support for the left and right seat back portions 48, 50 can be achieved without requiring a separate, dedicated seat back support structure.

The body structure 39 is shown to in FIGS. 3, and 5-7, to define rear left and right wheel wells 80, 82 extending upwardly from the floor 46. Each of the left leg member 40, the right leg member 44, and the support member 52 are shown to be spaced from each of the rear left and rear right wheel wells 80, 82 such that, during operation of the vehicle 20, the body structure 39 can flex.

Although the embodiments above have been described with respect to pivoting cover panels, it will be appreciated that cover panels can be provided in any of a variety of other suitable arrangements. For example, a cover panel can alternatively be retained beneath the cargo surface when in the stowed position and then be correspondingly slid into the bridging position. It will also be appreciated that a rear seating assembly can be provided in any of a variety of suitable alternative arrangements. For example, a rear seating assembly might not comprise a bifurcated-type arrangement including two or more separate seat back portions (e.g., 48, 50) as described above. Instead, an alternative rear seating assembly can include only one cover panel and seat back portion that extends substantially entirely between left and right sides of the vehicle.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
a body structure defining a floor;
a cargo surface supported with respect to the floor; and
a vehicular seat assembly comprising:
a left leg member attached to the floor, the left leg member comprising a central portion, an upper flange, and a lower flange, the upper flange and the lower flange each extending transversely relative to the central portion;
a right leg member spaced from the left leg member and attached to the floor, the right member comprising a central portion, an upper flange, and a lower flange, the upper flange and the lower flange each extending transversely relative to the central portion;
a support member extending between a left end and a right end, the support member attached to the upper flange of the left leg member adjacent to the left end, the support member attached to the upper flange of the right leg member adjacent to the right end, and the upper flange of the left leg member and the upper flange of the right leg member cooperating to provide underlying support for the support member;
a seat back pivotally supported directly by each of the left leg member and the right leg member and pivotable between an upright position and a cargo support position; and
a cover panel coupled with the support member and pivotable with respect to the support member between a stowed position and a bridging position; wherein:
the seat back and the cover panel are configured to pivot forwardly into the cargo support position and the bridging position, respectively;
pivoting the seat back between the upright position and the cargo support position facilitates pivoting of the cover panel between the stowed position and the bridging position, respectively; and
when the seat back is in the cargo support position with the cover panel in the bridging position, the support member provides underlying support for the cover panel, and the cargo surface, the cover panel, and the seat back cooperate to provide a generally planar load support surface.

2. The vehicle of claim 1 wherein:
the left leg member comprises a lobed portion that extends substantially perpendicularly to the upper and lower flanges of the left leg member;
the right leg member comprises a lobed portion that extends substantially perpendicularly to the upper and lower flanges of the right leg member; and the seat back is pivotally supported directly by each of the lobed portions of the left leg member and the right leg member.

3. A vehicle comprising:
a body structure defining a floor;
a cargo surface supported with respect to the floor; and
a vehicular seat assembly comprising:
  a left leg member attached to the floor, the left leg member comprising a central portion, an upper flange, and a lower flange, the upper flange and the lower flange each extending transversely relative to the central portion;
  a right leg member spaced from the left leg member and attached to the floor, the right leg member comprising a central portion, an upper flange, and a lower flange, the upper flange and the lower flange each extending transversely relative to the central portion;
  a center leg member spaced from the left and right leg members and attached to the floor;
  a support member extending between a left end and a right end, the support member attached to the upper flange of the left leg member adjacent to the left end, the support member attached to the upper flange of the right leg member adjacent to the right end, and the upper flange of the left leg member and the upper flange of the right leg member cooperating to provide underlying support for the support member;
  a left seat back portion pivotally supported directly by each of the left leg member and the center leg member and pivotable between an upright position and a cargo support position;
  a right seat back portion pivotally supported directly by each of the right leg member and the center leg member and pivotable between an upright position and a cargo support position;
  a left cover panel coupled with the support member and associated with the left seat back portion, the left cover panel being pivotable with respect to the support member between a stowed position and a bridging position; and
  a right cover panel coupled with the support member and associated with the right seat back portion, the right cover panel being pivotable with respect to the support member between a stowed position and a bridging position; wherein:
    the left cover panel is movably coupled with the left seat back portion such that movement of the left seat back portion between the upright position and the cargo support position facilitates movement of the left cover panel between the stowed position and the bridging position;
    the right cover panel is movably coupled with the right seat back portion such that movement of the right seat back portion between the upright position and the cargo support position facilitates movement of the right cover panel between the stowed position and the bridging position; and
    when the left seat back portion and the right seat back portion are in the respective cargo support positions with the respective left cover panel and the right cover panel in the respective bridging positions, the support member provides underlying support for each of the left cover panel and the right cover panel and the cargo surface, the left cover panel, the right cover panel, the left seat back portion, and the right seat back portion cooperate to provide a generally planar load support surface.

4. The vehicle of claim 3 wherein the body structure further defines rear left and right wheel wells extending upwardly from the floor, wherein each of the left leg member, the right leg member, and the support member are spaced from each of the rear left and right wheel wells.

5. The vehicle of claim 3, wherein the left seat back portion defines a left cargo support surface, the right seat back portion defines a right cargo support surface, the left cargo support surface is configured to selectively contact the left cover panel when the left cover panel is in the bridging position with the left seat back portion in the cargo support position, and the right cargo support surface is configured to selectively contact the right cover panel when the right cover panel is in the bridging position with the right seat back portion in the cargo support position.

6. The vehicle of claim 5, wherein the left cargo support surface is further configured to selectively contact the left cover panel when the left cover panel is in the stowed position with the left seat back portion in the upright position, and wherein the right cargo support surface is further configured to selectively contact the right cover panel when the right cover panel is in the stowed position with the right seat back portion in the upright position.

7. The vehicle of claim 3 wherein when the left seat back portion and the right seat back portion are in the respective upright positions, the left seat back portion and the right seat back portion retain the respective left cover panel and the right cover panel in the respective stowed positions.

8. The vehicle of claim 3 further comprising a seat bottom associated with each of the left seat back portion and the right seat back portion, wherein when the left seat back portion and the right seat back portion are in the respective upright positions, the seat bottom is configured to cooperate with the left seat back portion and the right seat back portion to facilitate support of at least one passenger.

9. The vehicle of claim 3 wherein the cargo surface is movable to provide selective access to an underlying cargo storage area.

10. The vehicle of claim 3 wherein the support member comprises a cargo attachment location.

11. The vehicle of claim 3 wherein:
  the left leg member comprises a lobed portion that extends substantially perpendicularly to the upper and lower flanges of the left leg member;
  the right leg member comprises a lobed portion that extends substantially perpendicularly to the upper and lower flanges of the right leg member; and
  the center leg member comprises a lobed portion;
  the left seat back portion is pivotally supported directly by each of the lobed portions of the left leg member and the center leg member; and
  a right seat back portion pivotally supported directly by each of the lobed portions of the right leg member and the center leg member.

12. A vehicular seat assembly comprising:
  a left leg member for attachment to a vehicle floor, the left leg member comprising a central portion, an upper flange, and a lower flange, the upper flange and the lower flange each extending transversely relative to the central portion;
  a right leg member spaced from the left leg member for attachment to a vehicle floor, the right leg member comprising a central portion, an upper flange, and a lower flange, the upper flange and the lower flange each extending transversely relative to the central portion;
  a support member extending between a left end and a right end, the support member attached to the upper flange of the left leg member adjacent to the left end, the support member attached to the upper flange of the right leg member adjacent to the right end, and the left leg member and the right leg member cooperating to provide underlying support for the support member;

a seat back having a left seat back portion pivotally supported directly by the left leg member, and a right seat back portion pivotally supported directly by the right leg member, the seat back being pivotable between an upright position and a cargo support position; and a cover panel coupled with the support member and pivotable with respect to the support member between a stowed position when the seat back is in the upright position, and a bridging position when the seat back is in the cargo support position; wherein the seat back and the cover panel are configured to pivot forwardly into the cargo support position and the bridging position, respectively, and pivoting the seat back between the upright position and the cargo support position facilitates pivoting of the cover panel between the stowed position and the bridging position, respectively.

13. The vehicular seat assembly of claim 12 wherein, when the seat back is in the cargo support position with the cover panel in the bridging position, the support member provides underlying support for the cover panel.

14. The vehicular seat assembly of claim 12 wherein:
the left leg member comprises a lobed portion that extends substantially perpendicularly to the upper and lower flanges of the left leg member;
the right leg member comprises a lobed portion that extends substantially perpendicularly to the upper and lower flanges of the right leg member; and
the seat back is pivotally supported directly by each of the lobed portions of the left leg member and the right leg member.

15. A vehicular seat assembly comprising:
a left leg member for attachment to a vehicle floor, the left leg member comprising a central portion, an upper flange, and a lower flange, the upper flange and the lower flange each extending transversely relative to the central portion;
a right leg member spaced from the left leg member for attachment to a vehicle floor, the right leg member comprising a central portion, an upper flange, and a lower flange, the upper flange and the lower flange each extending transversely relative to the central portion;
a support member extending between a left end and a right end, the support member attached to the upper flange of the left leg member adjacent to the left end, the support member attached to the upper flange of the right leg member adjacent to the right end, and the respective upper flanges of the left leg member and the right leg member cooperating to provide underlying support for the support member;
a seat back having a left seat back portion pivotally supported directly by the left leg member, and a right seat back portion pivotally supported directly by the right leg member, the seat back being pivotable between an upright position and a cargo support position;
a cover panel coupled with the support member and movable with respect to the support member between a stowed position when the seat back is in the upright position, and a bridging position when the seat back is in the cargo support position; and a seat bottom fixed with respect to the left leg member and the right leg member; wherein:
when the seat back is in the cargo support position with the cover panel in the bridging position, the support member provides underlying support for the cover panel;
the cover panel is movably coupled with the seat back;
the cover panel automatically moves to the bridging position when the seat back is moved to the cargo support position, such that the cover panel and the seat back cooperate to provide a generally planar load support surface; and
when the seat back is moved to the upright position, the cover panel automatically moves to the stowed position and the seat back cooperates with the seat bottom to facilitate support of a passenger.

16. The vehicular seat assembly of claim 15 wherein the cover panel is pivotally coupled with the support member.

17. The vehicular seat assembly of claim 15, wherein the seat back defines a cargo support surface, and wherein the cargo support surface is configured to selectively contact the cover panel when the cover panel is in the bridging position with the seat back in the cargo support position.

18. The vehicular seat assembly of claim 17, wherein the cargo support surface is further configured to selectively contact the cover panel when the cover panel is in the stowed position with the seat back in the upright position.

19. The vehicular seat assembly of claim 15 further comprising a center leg member spaced from the left and right leg members and for attachment to a vehicle floor, the left seat back portion and the right seat back portion being pivotally supported directly by the center leg member.

20. The vehicular seat assembly of claim 19 wherein the support member is further attached to the center leg member.

21. The vehicular seat assembly of claim 15 wherein the left seat back portion is pivotable between an upright position and a cargo support position, and the right seat back portion is pivotable between an upright position and a cargo support position.

22. The vehicular seat assembly of claim 15 wherein the cover panel comprises a left cover panel and a right cover panel each pivotally coupled with the support member, the left cover panel automatically moves between the stowed position and the bridging position when the left seat back portion is moved between the upright position and the cargo support position, respectively, and the right cover panel automatically moves between the stowed position and the bridging position when the right seat back portion is moved between the upright position and the cargo support position, respectively.

23. The vehicular seat assembly of claim 15 wherein:
the left leg member comprises a lobed portion that extends substantially perpendicularly to the upper and lower flanges of the left leg member;
the right leg member comprises a lobed portion that extends substantially perpendicularly to the upper and lower flanges of the right leg member; and
the seat back is pivotally supported directly by each of the lobed portions of the left leg member and the right leg member.

* * * * *

UNITED STATES PATENT AND TRADEMARK OFFICE
CERTIFICATE OF CORRECTION

| | | |
|---|---|---|
| PATENT NO. | : 8,505,999 B2 | Page 1 of 1 |
| APPLICATION NO. | : 12/493613 | |
| DATED | : August 13, 2013 | |
| INVENTOR(S) | : Whalen et al. | |

It is certified that error appears in the above-identified patent and that said Letters Patent is hereby corrected as shown below:

In the Specification:
Column 5, line 23, change "seal" to --seat--;
Column 5, line 67, change "case" to --ease--.

In the Claims:
Claim 1, column 8, line 29, change "right member" to --right leg member--.

Signed and Sealed this
Nineteenth Day of November, 2013

Teresa Stanek Rea
*Deputy Director of the United States Patent and Trademark Office*